(12) United States Patent
Gadot

(10) Patent No.: US 7,800,052 B2
(45) Date of Patent: Sep. 21, 2010

(54) METHOD AND SYSTEM FOR STABILIZING GAIN OF A PHOTOMULTIPLER USED WITH A RADIATION DETECTOR

(75) Inventor: Raphael Gadot, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 760 days.

(21) Appl. No.: 11/606,780

(22) Filed: Nov. 30, 2006

(65) Prior Publication Data

US 2008/0265151 A1    Oct. 30, 2008

(51) Int. Cl.
*G01V 5/04* (2006.01)
(52) U.S. Cl. .............. 250/261; 250/370.11; 250/390.11
(58) Field of Classification Search ............... 250/261, 250/366, 252.1, 256, 262
See application file for complete search history.

(56) References Cited

U.S. PATENT DOCUMENTS

| | | | | |
|---|---|---|---|---|
| 4,058,728 A * | 11/1977 | Nickles | ................... | 250/369 |
| 4,300,043 A * | 11/1981 | Robbins | ................... | 250/262 |
| 4,433,240 A * | 2/1984 | Seeman | ................... | 250/256 |
| 4,629,895 A * | 12/1986 | Mestais et al. | ............... | 250/369 |
| 4,760,252 A | 7/1988 | Albats et al. | | |
| 4,879,463 A * | 11/1989 | Wraight et al. | ........... | 250/269.2 |
| 4,958,073 A | 9/1990 | Becker et al. | | |
| 5,023,449 A * | 6/1991 | Holenka et al. | ........... | 250/252.1 |
| 5,360,975 A * | 11/1994 | Stoller | ................... | 250/262 |
| 5,459,314 A * | 10/1995 | Plasek | ................... | 250/269.7 |
| 5,600,135 A * | 2/1997 | Jacobson | ................... | 250/261 |
| 5,660,627 A | 8/1997 | Manente et al. | | |
| 5,783,829 A * | 7/1998 | Sealock et al. | ............... | 250/367 |
| 6,087,656 A * | 7/2000 | Kimmich et al. | ........... | 250/252.1 |
| 6,423,972 B1 * | 7/2002 | Fehrenbacher et al. | . | 250/370.05 |
| 6,545,240 B2 * | 4/2003 | Kumar | ................... | 209/579 |
| 7,081,616 B2 * | 7/2006 | Grau et al. | ................... | 250/262 |
| 7,361,886 B2 * | 4/2008 | Stoller et al. | ............... | 250/269.1 |
| 7,394,072 B2 * | 7/2008 | Macciocchi | ............. | 250/363.09 |
| 7,446,308 B2 * | 11/2008 | Gilchrist et al. | ........... | 250/269.1 |
| 2005/0151084 A1 * | 7/2005 | Zibulevsky et al. | ...... | 250/363.03 |
| 2005/0257610 A1 * | 11/2005 | Gillen et al. | ............... | 73/152.02 |
| 2006/0065824 A1 * | 3/2006 | Mickael | ................... | 250/252.1 |
| 2006/0192095 A1 * | 8/2006 | Stoller et al. | ................ | 250/261 |
| 2007/0118399 A1 * | 5/2007 | Avinash et al. | ................ | 705/2 |
| 2008/0083870 A1 * | 4/2008 | Malmin et al. | ........... | 250/252.1 |

* cited by examiner

*Primary Examiner*—David P Porta
*Assistant Examiner*—Djura Malevic
(74) *Attorney, Agent, or Firm*—Shaun Sethna; Darla Fonseca; Charlotte Rutherford

(57) ABSTRACT

A method for controlling voltage applied to a photomultiplier used in a scintillation counter radiation detector includes determining numbers of voltage pulses having each of a plurality of predetermined amplitudes generated by the photomultiplier in response to radiation events being imparted to a scintillation detector. The numbers of voltage pulses at each of the predetermined amplitudes is conducted to a trained artificial neural network. The artificial neural network generates a signal corresponding to an amount of adjustment to the voltage applied to the photomultiplier.

46 Claims, 3 Drawing Sheets

METHOD AND SYSTEM FOR STABILIZING GAIN OF A PHOTOMULTIPLER USED WITH A RADIATION DETECTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of radiation detectors used with well logging instruments. More specifically, the invention relates to systems and methods for stabilizing the gain of photomultipliers used with such detectors so that energy of the detected radiation can be accurately determined.

2. Background Art

Radiation detectors are used in a number of different types of well logging instruments. Well logging instruments in general are sensors enclosed in various types of housings such that the housing and enclosed sensors can be moved along a wellbore drilled through subsurface Earth formations. A record with respect to time and/or depth is made of the measurements made by the various sensors, and such measurements are used to generate images or other representations of the spatial distribution of certain physical parameters of the subsurface formations.

Radiation detectors known in the art used with well logging instruments includes scintillation detectors. Scintillation detectors include a scintillation crystal made from an optically transparent material that is sensitive to one or more types of radiation. One such crystal, sensitive to gamma radiation, is made from thallium-doped sodium iodide. Other scintillation crystals are made from materials such as bismuth germanate, gadolinium silicate, or lutetium oxyorthosilicate. See, for example, U.S. Pat. No. 5,660,627 issued to Menente et al and assigned to the assignee of the present invention. The foregoing crystal materials generate a flash of light when exposed to gamma radiation. The amplitude of the light flash corresponds to the energy of the gamma ray photon entering the crystal. A photomultiplier is typically coupled to the crystal. A photomultiplier includes a photocathode that releases electrons when light is imparted to the cathode. A series of intervening electrodes, called dynodes, are disposed along an electron path between the cathode and an anode. Each successive dynode is held at a higher voltage than the previous dynode, and the anode is held at the highest voltage. Electrons released by the cathode are attracted to the successive dynodes, each time causing the successive dynodes to emit a plurality of electrons for each incoming electron. By the time the electron "cascade" reaches the anode there may be several orders of magnitude more electrons than were originally released by the photocathode in response to the incoming light flash. The result is that an electrical pulse develops across the anode, the magnitude of which corresponds to the amplitude of the incoming light pulse, and thus to the energy of the gamma photon that entered the crystal.

The photomultiplier is typically coupled to electronic circuitry that measures the amplitude of each pulse generated by the photomultiplier. The pulse amplitudes and numbers of pulses having each determined amplitude are used to make inferences about the characteristics of the formations being evaluated by the well logging instrument, based on the assumption that the pulse amplitudes correspond to known gamma photon energies. Typically, the pulse amplitude measuring circuitry assigns a "channel" to detected pulse amplitudes that fall with a predetermined range. For each detected pulse falling within a particular channel, a counter corresponding to the channel is incremented. Thus, a spectrum of detected radiation may be determined by determining numbers of counts in each channel counter. Evaluating the actual energy of such detected radiation events requires that the channels are calibrated with respect to detected radiation energy level.

It is known in the art to calibrate a photomultiplier by including an energy reference in the crystal. For example, a small amount of cesium-137 as a calibration source may be used because it generates monochromatic gamma rays having energy of 662 thousand electron volts (keV). During operation of the radiation detector, it is known in the art to adjust the voltage applied to the anode and dynodes of a photomultiplier such that the voltage pulses attributable to gamma photons emanating from the calibration source are maintained at a selected measured pulse amplitude. Such selected value is typically related to the "channel" assigned by the pulse amplitude measuring circuit to the detected voltage pulse. Circuitry in the well logging instrument determines the channel of the calibration source energy peak, and adjusts the voltage applied to the photomultiplier to maintain the determined peak in a selected channel or "window" of contiguous channels.

SUMMARY OF THE INVENTION

One aspect of the invention is a method for controlling voltage applied to a photomultiplier used in a scintillation counter radiation detector. A method according to this aspect of the invention includes determining numbers of voltage pulses having each of a plurality of predetermined amplitudes generated by the photomultiplier in response to radiation events being imparted to a scintillation detector. The numbers of voltage pulses at each of the predetermined amplitudes is conducted to a trained artificial neural network. The artificial neural network generates a signal corresponding to an amount of adjustment to the voltage applied to the photomultiplier.

A method for measuring a property of formations penetrated by a wellbore according to another aspect of the invention includes moving a well logging instrument along the wellbore. The instrument includes at least one radiation detector having a scintillation detector and a photomultiplier functionally coupled thereto. The method includes determining numbers of voltage pulses having each of a plurality of predetermined amplitudes generated by the photomultiplier in response to radiation events being imparted to a scintillation detector. The numbers of voltage pulses at each of the predetermined amplitudes are conducted to a trained artificial neural network. The artificial neural network generates a signal corresponding to an amount of adjustment to the voltage applied to the photomultiplier.

A radiation detector according to another aspect of the invention includes a scintillation detector. The scintillation detector included a calibration source therein. A photomultiplier is optically coupled to the scintillation detector. A controllable source of high voltage is coupled to the photomultiplier. A pulse amplitude analyzer is functionally coupled to an output of the photomultiplier. The analyzer is configured to determine amplitude of each voltage pulse generated by the photomultiplier. A trained artificial neural network is functionally coupled to an output of the pulse amplitude analyzer. The network trained to convert numbers of detected voltage pulses at each of a plurality of amplitudes into a signal to adjust the source of high voltage, such that a peak number of voltage pulses corresponding to detection of radiation events from the calibration source occurs in a selected voltage amplitude window of the analyzer.

A well logging instrument according to another aspect of the invention includes a housing configured to move along the interior of a wellbore drilled through Earth formations. A scintillation detector is disposed in the housing and is exposed to radiation emanating from the formations. The scintillation detector includes a calibration source therein. A photomultiplier is disposed in the housing and is optically coupled to the scintillation detector. A controllable source of high voltage is disposed in the housing and coupled to the photomultiplier. A pulse amplitude analyzer is functionally coupled to an output of the photomultiplier. The analyzer is configured to determine amplitude of each voltage pulse generated by the photomultiplier. A trained artificial neural network is functionally coupled to an output of the pulse amplitude analyzer. The network is trained to convert numbers of detected voltage pulses at each of a plurality of amplitudes into a signal to adjust the source of high voltage, such that a peak number of voltage pulses corresponding to detection of radiation events from the calibration source occurs in a selected voltage amplitude window of the analyzer.

Other aspects and advantages of the invention will be apparent from the following description and the appended claims.

DETAILED DESCRIPTION

Figure 1:
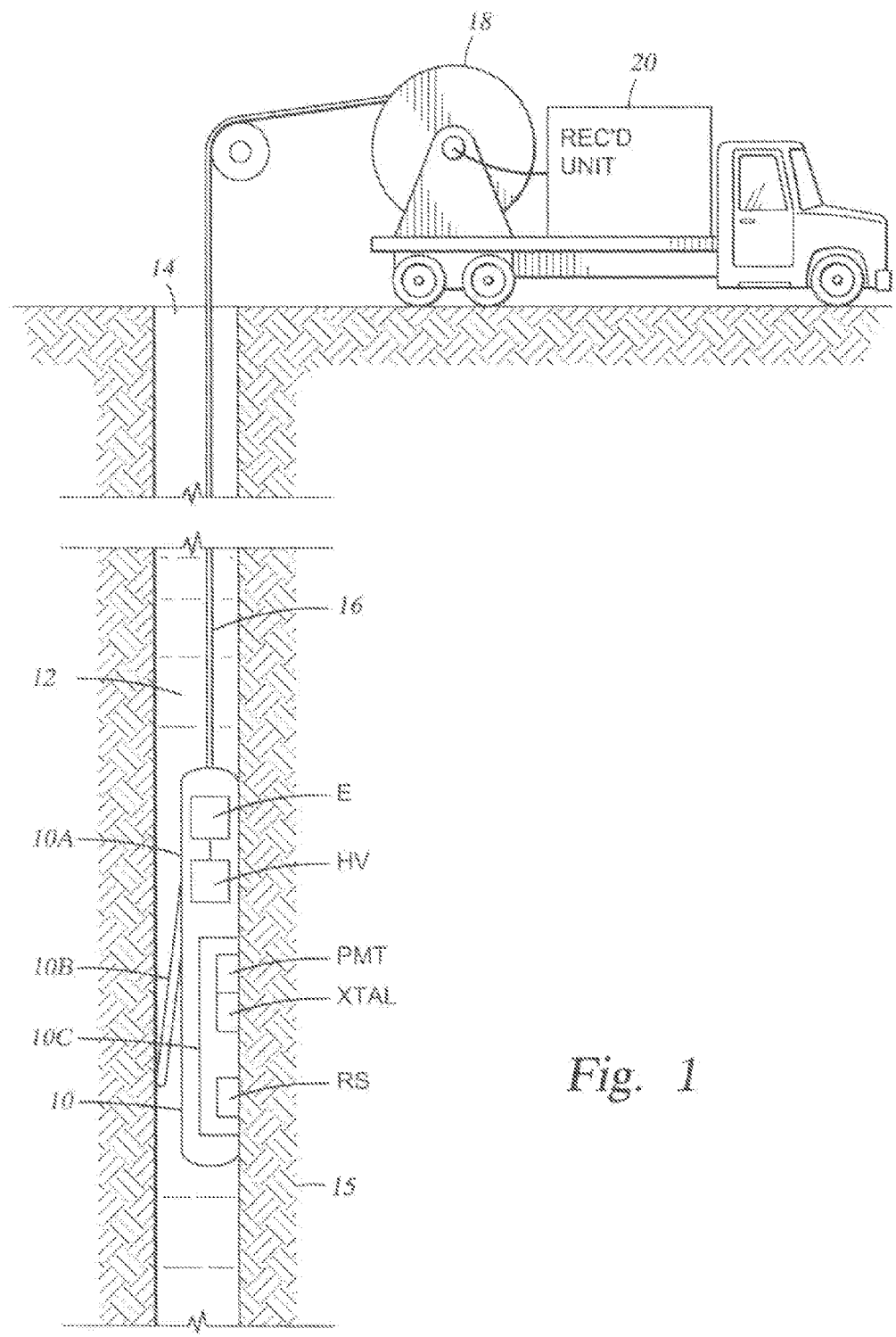
FIG. 1 shows a radiation measuring well logging instrument as it is ordinarily used in a wellbore drilled through subsurface Earth formations.

A well logging instrument including a scintillation detector type radiation counter is shown at 10 in FIG. 1 as it is ordinarily used in a procedure to make measurements of properties of subsurface Earth formations penetrated by a wellbore. The wellbore 12 is drilled through the formations, shown generally at 15. The wellbore 12 may be filled with liquid called "drilling mud" 14 during the drilling and well logging procedure. The well logging procedure includes lowering the well logging instrument 10 into the wellbore 12. The instrument 10 may be attached to one end of an armored electrical cable 16. The cable 16 is extended into the wellbore 12 by a winch 18 or similar spooling device to lower the instrument 10 into the wellbore 12. The winch 18 may then be operated to withdraw the cable 16 from the wellbore while various sensors (to be further explained) in the instrument 10 make measurements of various properties of the formations 15 penetrated by the wellbore 12. Electrical power may be transmitted along the cable 16 from the surface to operate the instrument 10. Signals corresponding to the measurements made by the various sensors in the instrument 10 may be transmitted along the cable 16 for recording and/or interpretation in a recording unit 20 at the Earth's surface.

The present example of the well logging instrument is a so-called "density" instrument that makes measurements corresponding to the density of the Earth formations 15. Such instruments include a housing 10A in which is disposed certain electronic circuitry, shown generally at E and to be further explained below. The housing 10A may include a back up pad or arm 10B that is biased to one side of the instrument 10 to urge the other side of the instrument 10 into contact with the wall of the wellbore 12. The other side of the instrument 10 may include a tungsten or similar high density skid or pad 10C in which is disposed a source of gamma radiation RS. The radiation source RS may be a chemical isotopic source such as cesium-137 disposed in a pressure proof housing. The radiation source may also be an electrically operated device such as an X-ray tube, or in instruments other than density instruments may be a chemical neutron source such as americium-beryllium, or a pulsed neutron generator that emits controlled duration "bursts" of high energy neutrons.

One or more radiation detectors including a scintillation detector crystal XTAL optically coupled to a photomultiplier PMT may be disposed in the pad 10C. A controllable high voltage power supply HV is coupled to the photomultiplier PMT to enable photons applied thereto to be converted to voltage pulses as will be familiar to those skilled in the art. The voltage output of the high voltage power supply HV can be controlled by a controller (not shown separately in FIG. 1) forming part of the circuitry E to cause the high voltage supply HV maintain a suitable voltage on the photomultiplier PMT.

It is to be clearly understood that the example well logging instrument shown in FIG. 1 is only for purposes of illustrating the source of photomultiplier-generated voltage pulses to be processed according to the invention, and an apparatus according to the invention that maintains suitable voltage on the photomultiplier. Other radiation detecting well logging instruments may include more than one scintillation type radiation detector, or radiation detectors responsive to different energy levels of radiation for analyzing different properties of the formations, and such instruments are within the scope of this invention. It is also to be clearly understood that the manner of conveyance of the well logging instrument 10 shown in FIG. 1 is merely illustrative of one manner of conveyance. Any manner of conveyance of a well logging instrument that makes radiation measurements as explained herein is also within the scope of this invention. Such conveyance methods include, but are not limited to, coupling the instrument to the end of a drill pipe, coiled tubing, production tubing or other pipe device, or housing the instrument in a drill collar adapted to be coupled within a drill string such that the instrument makes measurements during the drilling of the wellbore 12 through the formations 15, such conveyance known in the art as "logging while drilling" (LWD). It is also to be clearly understood that the wellbore configuration shown in FIG. 1, in which the wellbore is exposed directly to the formations (referred to as "open hole") is not a limit on the use of radiation detectors according to the various aspects of the invention. The invention is equally applicable in wellbores having a pipe or conduit inserted and/or cemented therein (referred to as "cased hole").

Figure 2:
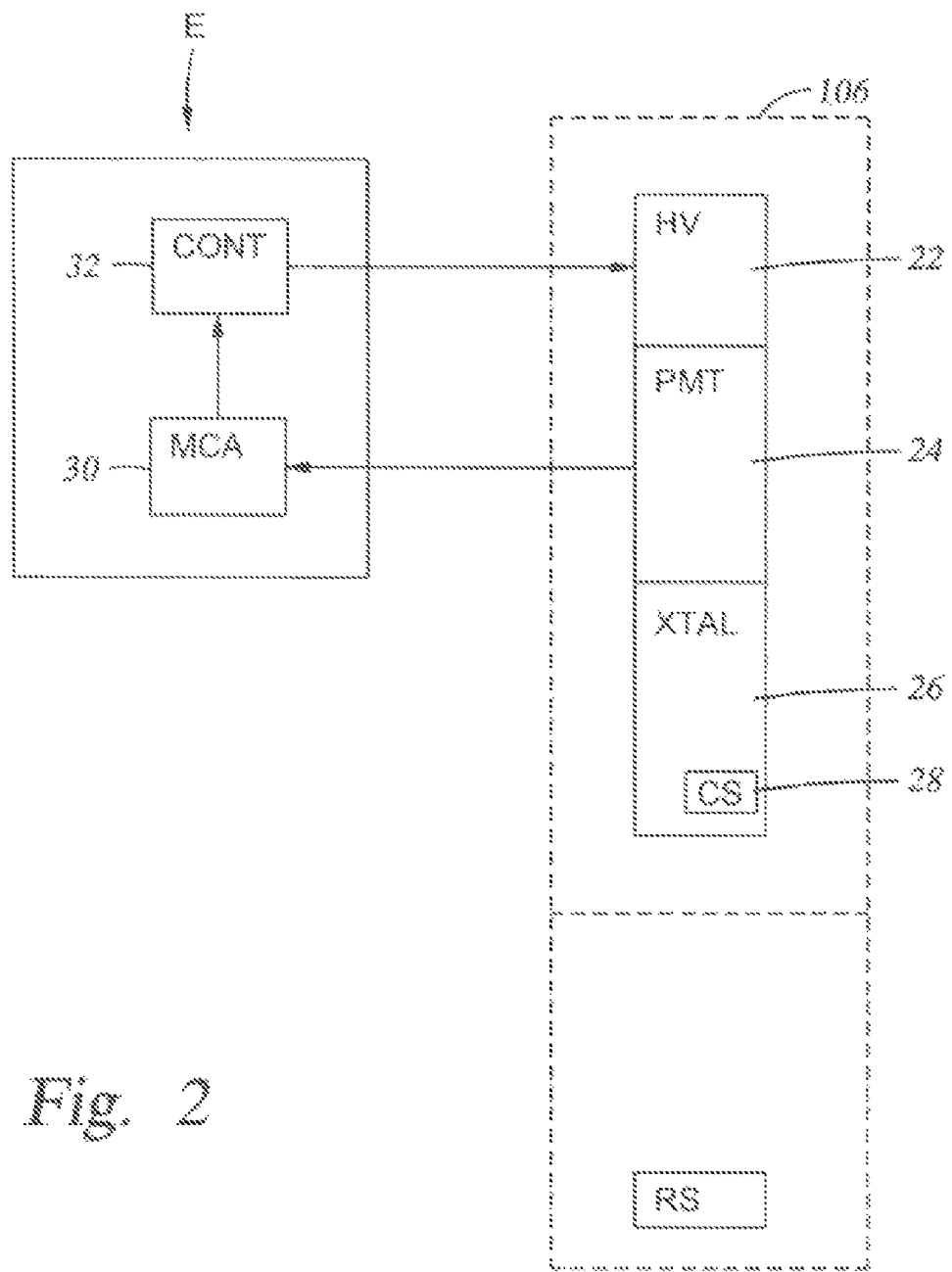
FIG. 2 shows a more detailed view of the active components of the well logging instrument of FIG. 1.

A more detailed view of the active components of the well logging instrument is shown in FIG. 2. The radiation source RS is shown disposed at one end of the pad 10C so as to minimize detection of radiation emanating directly from the source RS. The scintillation crystal 26 is disposed in the pad 10C such that it is exposed to radiation emanating from the surrounding Earth formations (15 in FIG. 1). The crystal 26 may be a material such as thallium-doped sodium iodide, bismuth germanate, gadolinium orthosilicate, lutetium oxyorthosilicate, lithium-6 doped silica glass, or any other material used to detect radiation that generates flashes of light when a suitable radiation particle or photon enters the crystal. The crystal 26 includes therein a calibration source 28 that includes a small active amount of a source of radiation of known energy spectrum. For example, in a density measuring device, the calibration source 28 may be cesium-137, because such source material emits substantially monochromatic gamma photons of energy 662 keV, as explained in the Background section herein. The crystal 26 is optically coupled to a photomultiplier 24 also substantially as explained in the Background section herein. The photomultiplier 24 is energized by a controllable high voltage supply 22. Typical voltages applied to the photomultiplier 24 will be in a range of 800 to 2200 volts, depending on the type of photomultiplier used. The high voltage supply 22 may have voltage output adjustable to a precision of one to five volts, although such resolution and the actual voltage range are not intended to limit the scope of this invention. The voltage applied by the high voltage source 22 is controlled by a controller 32 that will be further explained. The controller 32 may be a microprocessor based controller that can execute an embedded computer program.

As explained in the Background section herein, radiation to which the scintillation detector 26 is sensitive will, when entering the detector 26, cause the scintillation detector 26 to emit a flash of light having amplitude corresponding to the energy of the entering radiation event. The flash of light causes the photomultiplier 24 to produce a voltage pulse that corresponds in amplitude to the amplitude of the light flash generated by the detector 26. The voltage pulse output of the photomultiplier 24 may be coupled to a multichannel pulse amplitude analyzer ("MCA") 30. The MCA 30 may include a threshold discriminator to reject any pulse events having peak amplitude below a selected threshold (to avoid, for example, counting so called "dark currents" that may be output from the photomultiplier) and a peak amplitude detector to measure the peak amplitude of all detected voltage pulses above the threshold. Each detected voltage pulse will cause incrementing of a counter corresponding to the detected voltage pulse's peak amplitude. Numbers of detected pulses having particular detected amplitudes are used to spectrally analyze the energy content of the radiation detected by the scintillation detector 26. To accurately characterize the energy of the detected radiation events, it is necessary to characterize the output of the MCA 30 with respect to energy of the detected radiation. The invention has as a purpose controlling the voltage applied to the photomultiplier 24 so that the characterization of the MCA output remains related in a known manner with respect to the energy of the detected radiation.

Figure 3:
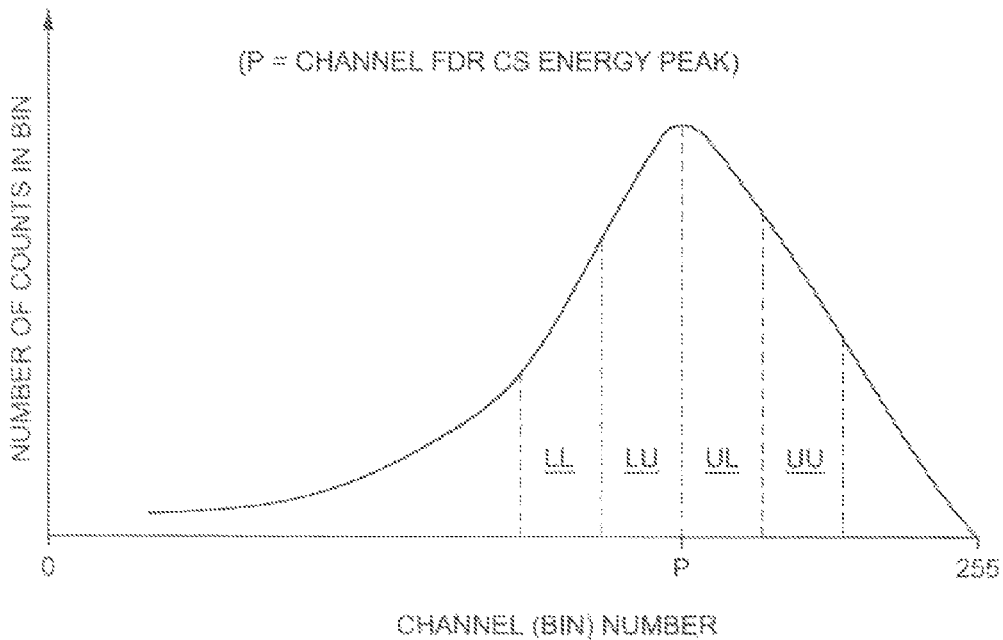
FIG. 3 shows an example spectrum of detector counts from a radiation detecting well logging instrument such as shown in FIG. 2.

FIG. 3 shows an example detected voltage count "spectrum" to explain the gain stabilization apparatus and method according to the invention. During operation of the well logging instrument, the detected voltage pulses can be assigned to one of four contiguous "windows" each covering a plurality (e.g., five to ten) of channels in the range of the MCA (30 in FIG. 2). The channels are indicated by LL, LU, UL, UU in FIG. 3. The channel indicated by P may be the channel for which the calibration source energy peak in the spectrum is determined. The voltage applied to the photomultiplier (24 in FIG. 2) is adjusted so that substantially equal numbers of detected voltage pulses (referred to as "counts") occur in each of the windows LU and UL, and that the peak number of such counts, which is associated with the radiation energy of the calibration source, is assigned to channel P, when corrected for background counts detected in outer windows LL and UU. The foregoing procedure may be repeated at statistically significant intervals of total number of detected counts. During operation, the MCA channel number for which the peak number of counts from the calibration source may vary from channel P may change due to a number of factors, including the detection count rate and ambient temperature, among other factors. The controller (32 in FIG. 2) is configured to control or command the high voltage supply (22 in FIG. 2) such that the peak number of counts associated with the calibration source is returned to the selected channel number P in the MCA output (30 in FIG. 2).

Figure 4:
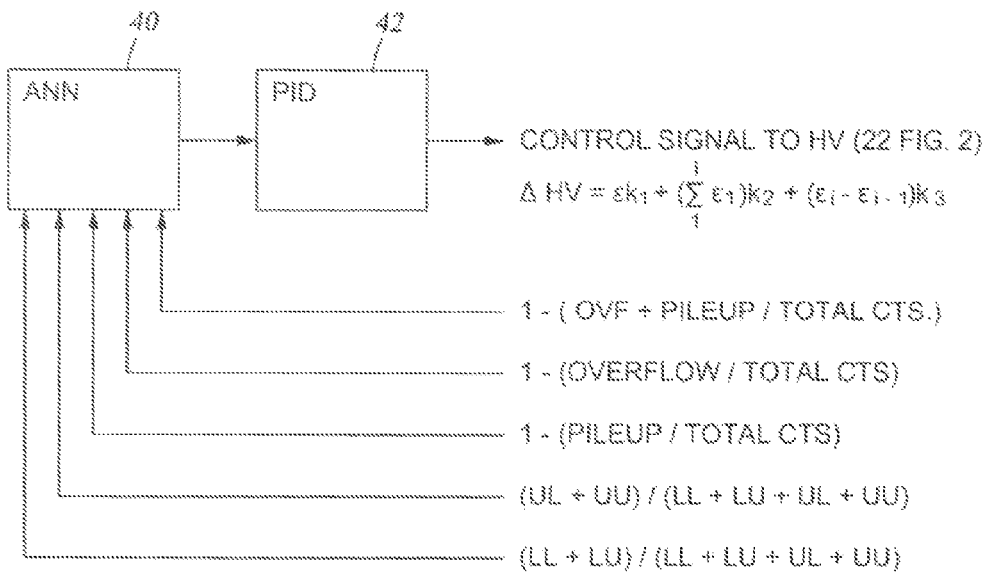
FIG. 4 shows one embodiment of a high voltage control system according to the invention.

In the present invention, the controller may be configured to include a trained artificial neural network program (ANN). The ANN provides an "error" signal representative of the difference between the preferred channel number for the calibration source energy peak and the actual channel number determined from the detected voltage pulses. The error signal can be used to operate a proportional integral differential (PID) control loop to adjust the voltage applied to the photomultiplier. The ANN and the PID control loop may be implemented in the controller (32 in FIG. 2) or may be implemented in separate electronic components in the circuitry (E in FIG. 1). Irrespective of the hardware implementation, the functionality that may be implemented in any embodiment will now be explained with reference to FIG. 4. The ANN 40 can accept as input two individual count ratios for all the voltage pulses (counts) detected in a statistically significant number of counts. The ratios may be: 1) the sum of the below-peak window counts (LL+LU) with respect to the total number of counts (LL+LU+UL+UU); and 2) the sum of the above peak window counts (UL+UU) with respect to the total number of counts. In the present embodiment, count rate ratios are used to facilitate training of the ANN 40 and to minimize the possibility of error in the results calculated by the ANN 40 as a result of differences in strength of various radioactive sources.

In some embodiments, the ANN 40 may also accept as input quantities related to the number of counts meeting certain threshold criteria. One such quantity is referred to as "pileup" counts. Pileup is a count assigned to a storage location other than an assigned channel of the MCA (30 in FIG. 2) as a result of two or more voltage events above the bias threshold being detected within a selected time span (programmed into the MCA). The selected time span typically represents a minimum recovery time for the photomultiplier. The photomultiplier typically requires a certain amount of recovery time after each voltage pulse to assure full proportionality between the incoming light level to the photomultiplier and the amplitude of the voltage pulse, because the current flowing in the photomultiplier does not return to zero instantaneously after generation of each pulse. Thus, pulses generated before the current drops to a threshold level may result in pulse amplitude not correspondent with the detected radiation energy level. Any voltage pulses occurring prior to the photomultiplier recovery time are therefore deemed to be unreliable for calibration peak detection, no less than for accurate detection of radiation events. Such counts may, however, be used to supply useful counting rate information to the ANN 40. Therefore, one input to the ANN 40 may be the quantity:

1−(pileup counts÷total counts)

where the total counts are all the counts made in all MCA channels to result in the statistically significant number of counts. Another type of voltage pulse that may occur that may be accounted for is called "overflow." Overflow counts are those having an energy level exceeding that which is attributable to the type of radiation being measured by the instrument. For example, in density instruments, all gamma ray photons that are relevant to the density measurement will have energy less than those generated by the radiation source (RS in FIG. 1), which in the present embodiment is the same as that of the calibration source (28 in FIG. 2). Higher energy detections are thus outliers with respect to the energy levels of interest, and such detected counts may be assigned to an "overflow" count register. High overflow counts may be indicative of certain subsurface conditions that may affect accuracy of the measurement made by the instrument. In the present embodiment, another input to the ANN 40 may be the quantity:

1−(overflow counts÷total counts).

Another quantity that may be used as input to the ANN 40 is the quantity:

1−[(overflow+pileup)÷total counts].

The output of the ANN 40 is an error signal. The error signal represents the difference between the expected channel number of the MCA (30 in FIG. 2) at which the calibration source peak is determined, and the preferred channel number for the calibration peak.

The error signal in the present embodiment may be used as input to a PID loop 42. The PID loop generates a signal that can cause the high voltage supply (22 in FIG. 2) to change voltage by an amount determinable according to the following formula:

$$\Delta HV = k_1 \varepsilon + k_2 \sum_{i=1}^{i} \varepsilon_i + k_3(\varepsilon_i - \varepsilon_{i-1})$$

where $\varepsilon$ represents the error signal generated by the ANN 40, i represents the index of the current error value, and $k_1$, $k_2$, $k_3$ are the PID coefficients. The coefficients can be determined empirically for any particular instrument configuration.

It is contemplated that training the ANN 40 should include a range of voltages to be applied to the photomultiplier, depending on the particular one used, o about 800 to 2,200 volts. Training the ANN 40 may include count rates representing the entire range of densities of materials expected to be sensed in the wellbore, including drilling fluid, and formations within known density ranges. The training of the ANN may also include recovery from no count intervals, such as when the instrument is powered off.

Embodiments of a method and system according to the invention may provide accurate voltage control of a photomultiplier used in a scintillation type radiation detector without the need to develop complex voltage control algorithms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for controlling voltage applied to a photomultiplier used in a scintillation counter radiation detector, comprising:

determining numbers of voltage pulses having each of a plurality of predetermined amplitudes generated by the photomultiplier in response to radiation events being imparted to a scintillation detector;

conducting the numbers of voltage pulses at each of the predetermined amplitudes to a trained artificial neural network; and causing the artificial neural network to generate a signal corresponding to an amount of adjustment to the voltage applied to the photomultiplier.

2. The method of claim 1 wherein the signal from the artificial neural network is conducted to a proportional integral differential control loop, and a signal output from the control loop is applied to a high voltage supply voltage control.

3. The method of claim 2 wherein the output of the control loop is related to the sum of a first coefficient multiplied by the signal from the artificial neural network, a second coefficient multiplied by the sum of all signals from the artificial neural network and a third coefficient multiplied by the difference between a current signal from the artificial neural network and a previous signal from the artificial neural network.

4. The method of claim 1 wherein the numbers of voltage pulses are determined for a plurality of contiguous amplitude ranges above and below an energy peak of a calibration radiation source exposed to the detector.

5. The method of claim 4 wherein the signal from the artificial neural network causes the voltage change to result in a peak number of voltage pulses corresponding to energy from the calibration source to remain substantially at a selected amplitude.

6. The method of claim 4 wherein the calibration source comprises cesium-137.

7. The method of claim 4 wherein the numbers of voltage pulses are determined for two contiguous amplitude ranges above the energy peak and two contiguous ranges below the energy peak, and the numbers conducted to the artificial neural network include a sum of the two contiguous ranges above the peak with respect to a total number of pulses and a sum of the two contiguous ranges below the peak with respect to the total number of pulses.

8. The method of claim 1 wherein the scintillation detector comprises at least one of thallium doped sodium iodide, bismuth germanate, gadolinium orthosilicate, lutetium oxyorthosilicate and lithium-6 doped silica glass.

9. The method of claim 1 wherein the radiation events imparted to the scintillation detector result from interaction of radiation from a radiation source with Earth formations surrounding a wellbore.

10. The method of claim 9 wherein the radiation source comprises a gamma ray source.

11. The method of claim 10 wherein the radiation events imparted to the scintillation detector are related to a density of the Earth formations.

12. The method of claim 9 wherein the radiation source comprises a pulsed neutron source.

13. The method of claim 1 wherein a number of a plurality of voltage pulses detected within a selected time window related to recovery time of the photomultiplier is excluded from the determined number of voltage pulses and a quantity related thereto is conducted as a separate input to the artificial neural network.

14. The method of claim 1 wherein voltage pulses exceeding a selected amplitude threshold are excluded from the determined number of voltage pulses and a quantity related thereto is conducted as a separate input to the artificial neural network.

15. A method for measuring a property of formations penetrated by a wellbore, comprising:
- moving a well logging instrument along the wellbore, the instrument including at least one radiation detector having a scintillation detector and a photomultiplier functionally coupled thereto;
- determining numbers of voltage pulses having each of a plurality of predetermined amplitudes generated by the photomultiplier in response to radiation events being imparted to a scintillation detector;
- conducting the numbers of voltage pulses at each of the predetermined amplitudes to a trained artificial neural network; and
- causing the artificial neural network to generate a signal corresponding to an amount of adjustment to the voltage applied to the photomultiplier.

16. The method of claim 15 wherein the signal from the artificial neural network is conducted to a proportional integral differential control loop, and a signal output from the control loop is applied to a high voltage supply voltage control.

17. The method of claim 16 wherein the output of the control loop is related to the sum of a first coefficient multiplied by the signal from the artificial neural network, a second coefficient multiplied by the sum of all signals from the artificial neural network and a third coefficient multiplied by the difference between a current signal from the artificial neural network and a previous signal from the artificial neural network.

18. The method of claim 15 wherein the numbers of voltage pulses are determined for a plurality of contiguous amplitude ranges above and below an energy peak of a calibration radiation source exposed to the detector.

19. The method of claim 18 wherein the signal from the artificial neural network causes the voltage change to result in a peak number of voltage pulses corresponding to energy from the calibration source to remain substantially at a selected amplitude.

20. The method of claim 18 wherein the calibration source comprises cesium-137.

21. The method of claim 18 wherein the numbers of voltage pulses are determined for two contiguous amplitude ranges above the energy peak and two contiguous ranges below the energy peak, and the numbers conducted to the artificial neural network include a sum of the two contiguous ranges above the peak with respect to a total number of pulses and a sum of the two contiguous ranges below the peak with respect to the total number of pulses.

22. The method of claim 15 wherein the scintillation detector comprises at least one of thallium doped sodium iodide, bismuth germanate, gadolinium orthosilicate, lutetium oxyorthosilicate and lithium-6 doped silica glass.

23. The method of claim 15 wherein the radiation events imparted to the scintillation detector result from interaction of radiation from a radiation source with Earth formations surrounding a wellbore.

24. The method of claim 23 wherein the radiation source comprises a gamma ray source.

25. The method of claim 24 wherein the radiation events imparted to the scintillation detector are related to a density of the Earth formations.

26. The method of claim 23 wherein the radiation source comprises a pulsed neutron source.

27. The method of claim 15 wherein a number of a plurality of voltage pulses detected within a selected time window related to recovery time of the photomultiplier is excluded from the determined number of voltage pulses and a quantity related thereto is conducted as a separate input to the artificial neural network.

28. The method of claim 15 wherein voltage pulses exceeding a selected amplitude threshold are excluded from the determined number of voltage pulses and a quantity related thereto is conducted as a separate input to the artificial neural network.

29. A radiation detector, comprising:
- a scintillation detector, the scintillation detector including a calibration source therein;
- a photomultiplier optically coupled to the scintillation detector;
- a controllable source of high voltage coupled to the photomultiplier;
- a pulse amplitude analyzer coupled to an output of the photomultiplier, the analyzer configured to determine amplitude of each voltage pulse generated by the photomultiplier; and
- a trained artificial neural network functionally coupled to an output of the pulse amplitude analyzer, the network trained to convert numbers of detected voltage pulses at each of a plurality of amplitudes into a signal to adjust the source of high voltage such that a peak number of voltage pulses corresponding to detection of radiation events from the calibration source occurs in a selected voltage amplitude window of the analyzer.

30. The radiation detector of claim 29 wherein the calibration source comprises cesium 137.

31. The radiation detector of claim 29 wherein the scintillation counter comprises a crystal including at least one of thallium doped sodium iodide, bismuth germanate, gadolinium orthosilicate, lutetium oxyorthosilicate and lithium-6 doped silica glass.

32. The radiation detector of claim 29 wherein the signal output of the network is functionally coupled to an input of a proportional integral differential control loop, an output of the control loop functionally coupled to a voltage control input of the high voltage source.

33. The radiation detector of claim 32 wherein the control loop is configured such that an output thereof is related to the sum of a first coefficient multiplied by the signal from the artificial neural network, a second coefficient multiplied by the sum of all signals from the artificial neural network and a third coefficient multiplied by the difference between a current signal from the artificial neural network and a previous signal from the artificial neural network.

34. The radiation detector of claim 29 wherein the analyzer is configured such that a number of a plurality of voltage pulses detected within a selected time window related to recovery time of the photomultiplier is excluded from the detected number of voltage pulses, the analyzer configured to store a quantity related to such excluded pulses, a storage of such number of excluded pulses functionally coupled as a separate input to the artificial neural network.

35. The radiation detector of claim 29 wherein the analyzer is configured to exclude voltage pulses exceeding a selected amplitude threshold are excluded from the detected number of voltage pulses, the analyzer configure to store a quantity related to such voltage pulses, a storage of such number of such pulses functionally coupled as a separate input to the artificial neural network.

36. A well logging instrument, comprising:
- a housing configured to move along the interior of a wellbore drilled through Earth formations;

a scintillation detector disposed in the housing and exposed to radiation emanating from the formations, the scintillation detector including a calibration source therein;

a photomultiplier disposed in the housing and optically coupled to the scintillation detector;

a controllable source of high voltage disposed in the housing and coupled to the photomultiplier;

a pulse amplitude analyzer coupled to an output of the photomultiplier, the analyzer configured to determine amplitude of each voltage pulse generated by the photomultiplier; and a trained artificial neural network functionally coupled to an output of the pulse amplitude analyzer, the network trained to convert numbers of detected voltage pulses at each of a plurality of amplitudes into a signal to adjust the source of high voltage such that a peak number of voltage pulses corresponding to detection of radiation events from the calibration source occurs in a selected voltage amplitude window of the analyzer.

37. The instrument of claim 36 wherein the calibration source comprises cesium 137.

38. The instrument of claim 36 wherein the scintillation counter comprises a crystal including at least one of thallium doped sodium iodide, bismuth germanate, gadolinium orthosilicate, lutetium oxyorthosilicate, lithium-6 doped silica glass.

39. The instrument of claim 36 wherein the signal output of the network is functionally coupled to an input of a proportional integral differential control loop, an output of the control loop functionally coupled to a voltage control input of the high voltage source.

40. The instrument of claim 39 wherein the control loop is configured such that an output thereof is related to the sum of a first coefficient multiplied by the signal from the artificial neural network, a second coefficient multiplied by the sum of all signals from the artificial neural network and a third coefficient multiplied by the difference between a current signal from the artificial neural network and a previous signal from the artificial neural network.

41. The instrument of claim 36 wherein the analyzer is configured such that a number of a plurality of voltage pulses detected within a selected time window related to recovery time of the photomultiplier is excluded from the detected number of voltage pulses, the analyzer configured to store a quantity related to such excluded pulses, a storage of such number of excluded pulses functionally coupled as a separate input to the artificial neural network.

42. The instrument of claim 41 wherein the analyzer is configured to exclude voltage pulses exceeding a selected amplitude threshold are excluded from the detected number of voltage pulses, the analyzer configure to store a quantity related to such voltage pulses, a storage of such number of such pulses functionally coupled as a separate input to the artificial neural network.

43. The instrument of claim 36 further comprising a source of radiation proximate the housing, the radiation source providing radiation to the Earth formations for detection of radiation events related to interaction of the radiation with the formations.

44. The instrument of claim 36 wherein the source of radiation comprises a cesium 137 source.

45. The instrument of claim 36 wherein the source of radiation comprises a pulsed neutron source.

46. The instrument of claim 36 wherein the source of radiation comprises an X-ray source.

* * * * *